United States Patent [19]

Kadowaki et al.

[11] Patent Number: 4,985,689
[45] Date of Patent: Jan. 15, 1991

[54] MICROWAVE SEMICONDUCTOR SWITCH

[75] Inventors: Yoshinobu Kadowaki; Yutaka Yoshii, both of Hyogo, Japan

[73] Assignee: Mitsubishi Denki Kabushiki Kaisha, Japan

[21] Appl. No.: 413,214

[22] Filed: Sep. 27, 1989

[30] Foreign Application Priority Data

Sep. 30, 1988 [JP] Japan ................. 63-247606

[51] Int. Cl.$^5$ .......................... H01P 1/10; H01P 1/15
[52] U.S. Cl. .................... 333/101; 333/103; 333/109
[58] Field of Search ............... 333/101, 103, 104, 109, 333/115, 116

[56] References Cited

U.S. PATENT DOCUMENTS

| | | |
|---|---|---|
| 3,475,700 | 10/1969 | Ertel . |
| 3,559,108 | 1/1971 | Seidel .................. 333/103 |
| 3,571,765 | 3/1971 | Friedman ............ 333/103 X |
| 4,701,724 | 10/1987 | Martin ................. 333/103 |
| 4,789,846 | 12/1988 | Matsunaga et al. ........... 333/104 |

FOREIGN PATENT DOCUMENTS

| | | |
|---|---|---|
| 52-120741 | 11/1977 | Japan . |
| 59-101934 | 6/1984 | Japan . |
| 210702 | 11/1984 | Japan ............ 333/104 |
| 60-174534 | 9/1985 | Japan . |
| 8704012 | 7/1987 | PCT Int'l Appl. . |

OTHER PUBLICATIONS

Helszahn, *Control Circuits for Microwave Applications Using P-i-n diodes*, Electronic Engineering, Jul. 1976, pp. 41–45.

Matsunaga et al., "An X-Band . . . Receive Switch", The Transactions of the IEICE, vol. E 70, No. 4, Apr. 1987, pp. 259–260.

*Primary Examiner*—Paul Gensler
*Attorney, Agent, or Firm*—Leydig, Voit & Mayer

[57] ABSTRACT

A microwave transmit-receive switch for switching between transmission and reception of a microwave signal, includes a directional coupler, an antenna terminal connected with an input terminal of the directional coupler, a transmission terminal connected to the isolation terminal of the directional coupler, two switches connected between the respective output terminals of the directional coupler and ground, respectively, a quarter wavelength phase delay element connecting one output terminal to a reception terminal and a transmission line having no phase delay connecting the other output terminal to the reception terminal of the switching.

4 Claims, 2 Drawing Sheets

MICROWAVE SEMICONDUCTOR SWITCH

FIELD OF THE INVENTION

The present invention relates to a microwave transmit-receive switch, and, more particularly, to an improvement in a circuit construction of a transmit-receive switch (hereinafter referred to as a "TR" switch) for microwave frequencies.

BACKGROUND OF THE INVENTION

FIG. 3 shows a circuit construction of a prior art microwave transmit receive switch.

In FIG. 3, the microwave transmit-receive switch includes semiconductor switching elements $1a$ and $1b$, such as diodes or transistors, a receiving terminal 2 and transmission terminal 3, and a common signal terminal 4 connected with an antenna. Quarter wavelength transmission lines 21 and 31 connect the switching elements $1a$ and $1b$ and the branching point 5 where the line branches from the antenna terminal 4 to the transmission terminal 3 and the receiving terminal 2.

The device will operate as follows.

When a signal from the antenna terminal 4 is to be received, the switching element $1b$ connected with the transmission terminal 3 is closed and the switching element $1a$ connected with the receiving terminal 2 is opened. In this state, since the switching element $1b$ is closed, the characteristic impedance of the transmission line viewed from the branching point 5 toward the transmission terminal 3 is very high, and the signal flows into the receiving terminal 2.

On the other hand, when a signal is transmitted from the transmission terminal 3, the switching element $1a$ connected with the receiving terminal 2 is closed and the switching element $1b$ connected with the transmission terminal 3 is opened. Then, the characteristic impedance of the transmission line viewed from the branching point 5 toward the receiving terminal 2 is very high, and a transmission signal is sent out to the antenna terminal 4.

Generally, a transmission signal is a high power signal and the power thereof amounts to about 100 times that of the receiving signal. That is, the transmission signal has a power of about 10 to 20 W. Therefore, in handling such high power signal, the switching element $1b$ is required to have a high breakdown voltage in its opened state in the prior art microwave transmit-receive switch. In realizing high breakdown voltage in a switching semiconductor element, however, there are production technique limitations, and further the element size has inevitably increased. This has further resulted in a problem in microwave transmit-receive switches in a monolithic microwave integrated circuit (hereinafter referred to as "MMIC"). The cost inevitably increases due to the increase in the area of MMIC chip, accompanied by restricted power handling capability. In addition, in such a microwave circuit, even when the switching elements $1a$ and $1b$ are closed, it is not possible to make the switching elements completely short-circuited. That is, even though the characteristic impedances of the quarter wavelength phase delay lines 21 and 31 are 50 $\Omega$, the high frequency resistances which arise in the switching elements $1a$ and $1b$ are added thereto, and therefore impedance matching between the quarter wavelength phase delay line 21 and 31 and the respective terminals cannot be obtained due to the inductances of the switching elements. Furthermore, in order to improve impedance matching and obtain a desired impedance, matching circuits are required, resulting in complicated circuitry.

SUMMARY OF THE INVENTION

It is an object of the present invention to provide a microwave transmit-receive switch that is constructed easily, and has a large power handling capability.

Other objects and advantages of the present invention will become apparent from the detailed description given hereinafter; it should be understood, however, that the detailed description and specific embodiment are given by way of illustration only, since various changes and modifications within the spirit and the scope of the invention will become apparent to those skilled in the art from this detailed description.

According to the present invention, two switching elements are provided between two coupling terminals of a directional coupler and ground, and a quarter wavelength phase delay line is inserted between one of two lines which are branched from the connecting terminals of the directional coupler. Furthermore, the two lines are connected with each other to produce a receiving terminal of the switching signal, the isolation terminal of the directional coupler is transmission terminal for the switching signal, and the signal input terminal is a common (antenna) terminal of the switching signal. Thus, the switching elements connected with the two coupling terminals of the directional coupler are opened for receiving and closed for transmission, thereby enabling transmission of power.

According to another aspect of the present invention, the microwave semiconductor switch includes two directional couplers and a plurality of switching elements, and the input signal terminal of one directional coupler is a common (antenna) terminal for the switching signal, the isolation terminal thereof is a receiving signal terminal. Switching elements are connected between the coupling terminals of the directional coupler and the coupling terminals of the other directional coupler, and the input terminal of the other directional coupler is a transmission signal terminal. Thus, the switching elements connected with the coupling terminal of the directional coupler are opened for receiving and closed for transmission, thereby enabling transmission of power.

DETAILED DESCRIPTION OF THE PREFERRED EMBODIMENTS

An embodiment of the present invention will be described in detail with reference to the drawings.

Figure 1:
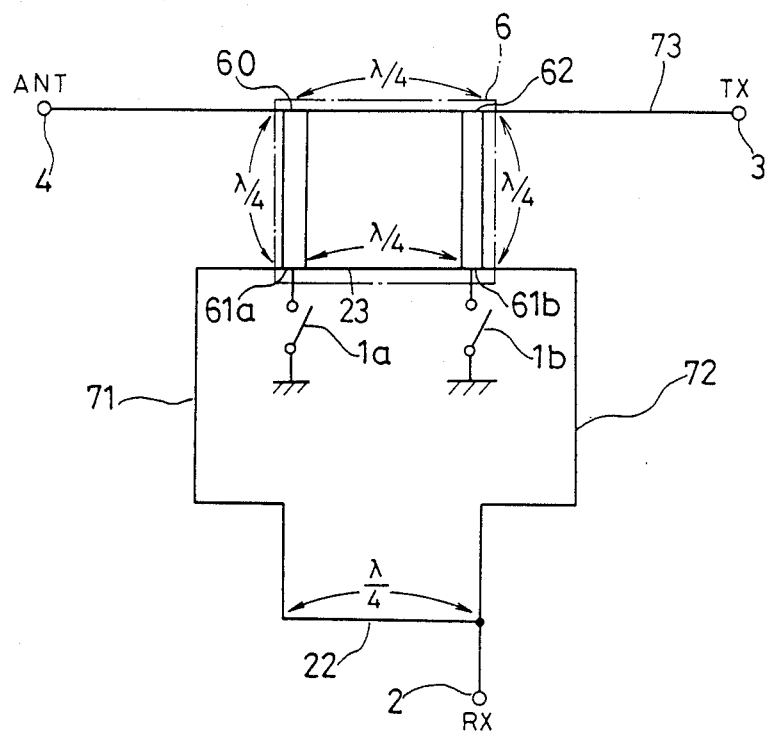
FIG. 1 is a diagram showing a circuit construction of a microwave transmit-receive switch according to a first embodiment of the present invention.

FIG. 1 shows a circuit construction of a microwave transmit-receive switch according to a first embodiment of the present invention. In FIG. 1, the transmit-receive switch includes switching elements $1a$ and $1b$ such as diodes or transistors, a receiving terminal and transmission terminal 2 and 3, an antenna terminal 4, a 3 dB directional coupler 6, a quarter wavelength phase delay line 22, an input terminal 60, coupling terminals 61a and 61b, an isolation terminal 62 of the directional coupler 6, and transmission lines 71, 72, and 73.

The switching elements 1a and 1b are connected between the coupling terminals 61a and 61b and ground, respectively. One end of each of the transmission lines 71 and 72 is connected with the coupling terminals 61a and 61b of the directional coupler 6, respectively. The quarter wavelength phase delay line 22 is connected with the other end of the transmission line 71. The other end of the phase delay line 22 and the other end of the transmission line 72 are connected with each other to produce the receiving terminal 2. In addition, the transmission terminal 3 is connected with the antenna terminal 4 via the transmission line 73. The transmission line 73 is connected with the isolation terminal 62 and the input terminal 60 of the directional coupler 6 at positions spaced apart from each other by a quarter wavelength.

The device will operate as follows.

When the switching elements 1a and 1b, which are connected with the coupling terminals 61a and 61b of the 3 dB directional coupler 6, are opened, the input signal from the antenna terminal 4 is divided into the coupling terminals 61a and 61b in a proportion of 1:1 and transmit on the transmission lines 71 and 72 connected with the coupling terminals 61a and 61b. Herein, the signals which transmitted on the quarter wavelength line 23 between the coupling terminals, respectively, are of less amount and mutually cancel each other, and have no influence on the following operation. The thus divided signals have a phase difference of a quarter wavelength therebetween and the signal advancing by a quarter wavelength and passing through the line 71 is delayed by a quarter wavelength by the quarter wavelength phase delay line 22 and is combined with the signal which has passed through the line 72. Thus, almost all input signals reach the receiving terminal 2. On the other hand, for transmission, when the switching elements 1a and 1b are closed, the signal sent out from the transmission terminal 3 is divided into two in a proportion of 1:1 by the directional coupler 6, and they flow through the two coupling terminals 61a and 61b, respectively. However, since the switching elements 1a and 1b are short-circuited, the signals are perfectly reflected and reach the common antenna terminal 4 without returning to the transmission terminal 3.

In the microwave transmit-receive switch of such a construction, at the transmission of a high power signal, the switching elements 1a and 1b are made in short-circuited and the transmission signals are perfectly reflected. Therefore, high breakdown voltage switching elements ar not required.

Furthermore, since this transmit-receive switch has a balanced type construction utilizing a directional coupler, if characteristics impedances of the switching elements 1a and 1b are equal to each other, the characteristic impedances of the transmission lines viewed from the antenna terminal 4 and from the transmission terminal 3 are determined only by characteristics of the directional coupler 6 regardless of whether the characteristic impedances of the switching elements are equal to that of the directional coupler 6 or not. Accordingly, the characteristic impedances of the lines viewed from the antenna terminal 4 and the transmission terminal 3 are improved by the characteristics of the impedance matching type directional coupler 6.

Figure 2:
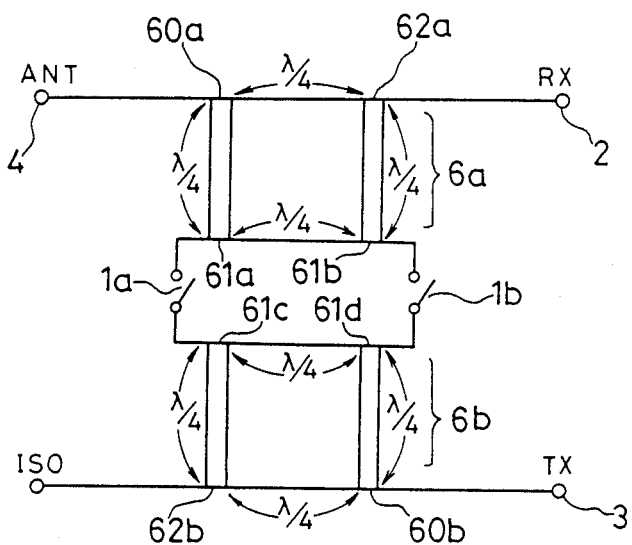
FIG. 2 is a diagram showing a circuit construction of a microwave transmit-receive switch according to a second embodiment of the present invention.
Figure 3:
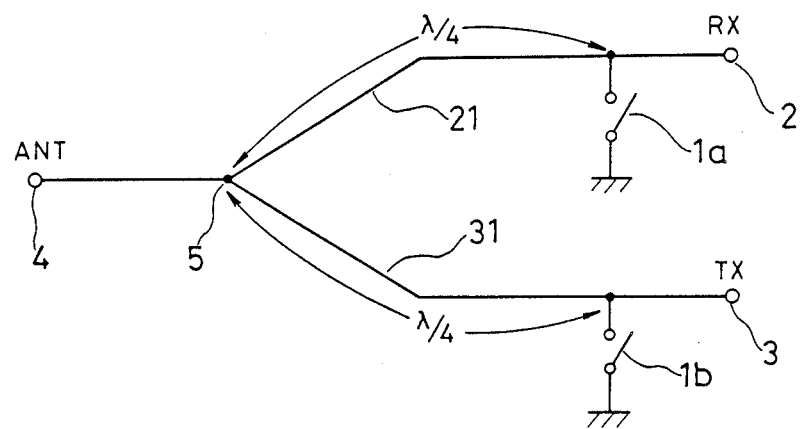
FIG. 3 is a diagram showing a circuit construction of a microwave transmit-receive switch according to the prior art.

FIG. 2 shows a construction of a microwave transmit-receive switch according to a second embodiment of the present invention. This transmit-receive switch has two directional couplers 6a and 6b, the directional coupler 6a has an input terminal 60a, isolation terminal 62a, and coupling terminals 61a and 61b, and the directional coupler 6b has an input terminal 60b, isolation terminal 62b, and coupling terminals 61c and 61d.

The directional couplers 6a and 6b are 3 dB directional couplers and the switching elements 1a and 1b are connected between the coupling terminals 61a and 61c and between the coupling terminals 61b and 61d, respectively. The input terminal 60a of the directional coupler 6a is a common antenna terminal 4 of the TR switch and the isolation terminal 62a of the directional coupler 6a is the receiving terminal 2 of the TR switch. The input terminal 60b of the directional coupler 6b which is connected with the directional coupler 6a via the switching elements 1a and 1b is a transmission terminal 3 from which a combined signal is output and the isolation terminal 62b of the directional coupler 6b is an isolation terminal ISO of the TR switch.

The device will operate as follows.

When the switching elements 1a and 1b which are connected between the coupling terminals 61a and 61c and between 61b and 61d of the two directional couplers 6a and 6b, respectively, are opened, the input signal from the antenna terminal 4 is divided into two by the characteristics of the 3 dB directional coupler 6a and the divided signals flow toward the coupling terminals 61a and 61b. Then, since the switching elements 1a and 1b are open, the signals are perfectly reflected and reach the receiving terminal 2.

On the other hand, at transmission, the signal sent out from the transmission terminal 3 is divided into 1:1 by the directional coupler 6b and the divided signals flow toward the coupling terminals 61c and 61d. Herein, when the switching elements 1a and 1b are closed, the signals pass through the switching elements 1a and 1b, are combined by the directional coupler 6a, and reach the common antenna terminal 4.

In this microwave TR switch, the switching elements 1a and 1b opened when processing a low power receiving signal and closed when processing a high power transmission signal. Accordingly, at transmission, the switching elements 1a and 1b have low impedance of about several ohms and currents flow therethrough without a high voltage being applied. Therefore, it is not required that switching elements 1a and 1b have a high breakdown voltage.

The microwave TR switch of this embodiment has also a balanced construction utilizing directional couplers similarly as in the first embodiment. Therefore, the impedance matching of the antenna terminal 4 and the transmission terminal 3 are improved depending on the characteristics of the directional couplers 6a and 6b.

As discussed above, according to the present invention, two switching elements are provided between two coupling terminals of directional coupler and ground, respectively, and a quarter wavelength phase delay line is inserted in one of two lines which are branched from the coupling terminals of the directional coupler which has no phase delay. The two transmission lines are connected with each other to produce a receiving terminal of switching signal, the isolation terminal of the directional coupler is a transmission terminal of switching signal, and the signal input terminal is a common antenna terminal of switching signal. Thus, the switching elements connected with the two coupling terminals of the directional coupler are opened for receiving and closed for transmission, thereby enabling transmission of power.

According to another aspect of the present invention, the microwave semiconductor switch is constituted by two directional couplers and a plurality of switching elements, and the input signal terminal of a directional coupler is a common antenna terminal of the switching signal, the isolation terminal thereof is a receiving signal terminal, a switching element is connected between the coupling terminal thereof and the coupling terminal of the other directional coupler, and the input terminal of the other directional coupler is a transmission signal terminal. Thus, the switching elements connected between the coupling terminals of the directional couplers are opened for receiving and closed for transmission, thereby enabling transmission of power.

What is claimed is:

1. A microwave transmit-receive switch for switching between transmission and reception of microwave signals comprising:
   a directional coupler having a directional isolation input terminal, a second input terminal, and first and second output terminals;
   an antenna terminal connected to the second input terminal of said directional coupler;
   a transmitting terminal connected to said directional isolation input terminal of said directional coupler;
   first and second switching elements respectively connected between said first and second output terminals of said directional coupler and ground; and
   a reception terminal connected to said first output terminal through a transmission line having no phase delay and to said second output terminal through a transmission line have a one quarter wavelength phase delay.

2. A microwave transmit-receive switch as defined in claim 1 wherein said directional coupler is a 3 dB directional coupler.

3. A microwave transmit-receive switch as defined in claim 1 wherein said switching elements are transistors.

4. A microwave transmit-receive switch as defined in claim 1 wherein said switching elements are diodes.

* * * * *